(12) United States Patent
Sandoval et al.

(10) Patent No.: US 9,132,795 B1
(45) Date of Patent: Sep. 15, 2015

(54) VEHICLE BUMPER APPARATUS AND SYSTEM FOR PIT MANEUVERS

(76) Inventors: Tino Sandoval, Fresno, CA (US); John Hustedde, Fresno, CA (US)

( * ) Notice: Subject to any disclaimer, the term of this patent is extended or adjusted under 35 U.S.C. 154(b) by 0 days.

(21) Appl. No.: 13/455,348

(22) Filed: Apr. 25, 2012

Related U.S. Application Data

(60) Provisional application No. 61/478,891, filed on Apr. 25, 2011.

(51) Int. Cl.
 *B60R 19/44* (2006.01)

(52) U.S. Cl.
 CPC ...................................... *B60R 19/44* (2013.01)

(58) Field of Classification Search
 CPC ........ B60R 19/42; B60R 19/24; B60R 19/44; B60R 2019/247
 USPC ................... 293/126; 296/126, 142
 See application file for complete search history.

(56) References Cited

U.S. PATENT DOCUMENTS

| | | | | |
|---|---|---|---|---|
| 896,104 | A * | 8/1908 | Guhle | 293/127 |
| 1,091,331 | A * | 3/1914 | Hammarstrom | 293/126 |
| 1,465,589 | A * | 8/1923 | Rodgers | 293/124 |
| 1,544,613 | A * | 7/1925 | Traver | 293/126 |
| 1,546,947 | A * | 7/1925 | Sohl | 293/126 |
| 1,556,490 | A * | 10/1925 | Chick | 293/126 |
| 1,588,678 | A * | 6/1926 | Gstalder | 293/126 |
| 1,588,736 | A * | 6/1926 | Hornquist | 293/128 |
| 1,649,404 | A * | 11/1927 | Hawkes | 224/489 |
| 1,698,696 | A * | 1/1929 | Goodrich | 293/126 |
| 2,158,813 | A * | 5/1939 | Altmyer | 293/127 |
| 2,187,952 | A * | 1/1940 | Rusche | 293/126 |
| 2,197,532 | A * | 4/1940 | Spitz | 293/126 |
| 3,622,181 | A * | 11/1971 | Smith | 280/476.1 |
| 3,830,539 | A * | 8/1974 | Yoshie et al. | 293/149 |
| 4,498,696 | A * | 2/1985 | Kalchschmied et al. | 293/126 |
| 4,657,299 | A * | 4/1987 | Mahan | 296/159 |
| 4,958,761 | A * | 9/1990 | Tenney | 224/316 |
| 4,993,765 | A * | 2/1991 | Ryan | 293/127 |
| 5,602,341 | A * | 2/1997 | Lee et al. | 73/850 |
| 6,179,354 | B1 * | 1/2001 | Bennett, Jr. | 293/128 |
| 2009/0218833 | A1* | 9/2009 | Rosemeyer | 293/115 |
| 2015/0021937 | A1* | 1/2015 | Perez | 293/115 |

FOREIGN PATENT DOCUMENTS

| | | | | |
|---|---|---|---|---|
| DE | 2361213 | A1 * | 6/1975 | B60R 19/26 |
| EP | 1040969 | A1 * | 10/2000 | B60R 19/24 |
| FR | 2639297 | A1 * | 5/1990 | B60R 19/42 |

(Continued)

*Primary Examiner* — Glenn Dayoan
*Assistant Examiner* — Paul Chenevert
(74) *Attorney, Agent, or Firm* — Dale J. Ream

(57) ABSTRACT

A bumper apparatus and system for use with vehicles, particularly law enforcement vehicles such as police cars and the like, that is configured to allow the user to easily and quickly remove the apparatus from the vehicle and to protect the vehicle from damage when executing a PIT maneuver (Precision Immobilization Technique). The bumper apparatus comprises a bumper guard and one or more attachment mechanisms configured to removably attach the bumper guard to the vehicle with the bumper guard disposed outwardly of the bumper at an end of the vehicle and outwardly from a side of the vehicle. The bumper guard has a side section which extends across a forward or rearward portion of the vehicle. The bumper guard can extend across the back wheel and rear door of the vehicle. The attachment mechanisms have mounting members that engage the frame of the vehicle at one or more existing connectors thereon.

4 Claims, 4 Drawing Sheets

(56) References Cited

FOREIGN PATENT DOCUMENTS

| GB | 2187142 | A | * | 9/1987 | ............. | B60R 19/44 |
| GB | 2215282 | A | * | 9/1989 | ............. | B60R 19/44 |
| JP | 2007196915 | A | * | 8/2007 | | |

* cited by examiner

VEHICLE BUMPER APPARATUS AND SYSTEM FOR PIT MANEUVERS

CROSS-REFERENCE TO RELATED APPLICATIONS

This patent application claims the benefit of U.S. Provisional Patent Application No. 61/478,891 filed Apr. 25, 2011.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACK GROUND OF THE INVENTION

A. Field of the Invention

The present invention relates generally to apparatuses utilized with motor vehicles to facilitate use of the vehicle to accomplish specific objectives. In particular, the present invention relates to bumper apparatuses and systems for motor vehicles that facilitate use of the motor vehicle, typically by police and other law enforcement agencies, to engage or be engaged by another vehicle during a pursuit situation to stop or slow down the pursued vehicle. Even more particularly, the present invention relates to such apparatuses and systems that comprise one or more vehicle bumper guards that are removably attached to a vehicle.

B. Background

Police and other law enforcement personnel typically utilize specially configured motor vehicles to patrol the geographic area, such as the city, town, county, highway or other area, over which they have responsibility. These motor vehicles generally have an enhanced motor, transmission, suspension system and other vehicle operational components that allow the motor vehicle to perform in the intended manner, such as fast acceleration and traveling at high rates of speed for extended periods of time, and numerous electronic, safety and other law enforcement specialty equipment that enable the law enforcement officer to better perform his or her official duties. As a result of the enhancements to the motor vehicle, which defines the police car or the like, these motor vehicles are somewhat more expensive and require more training to operate than a standard "civilian" motor vehicle.

Law enforcement officers are commonly required to utilize their specialty vehicles to pursue another motor vehicle having one or more persons therein that are or may be wanted for criminal activity or which are fleeing the scene of a recent criminal act. While most people voluntarily stop their vehicle when they are required to do so by a law enforcement officer, typically by pulling the vehicle over to or near the side of the road, unfortunately there are some people who refuse to acquiesce to the officer's demand to stop their vehicle. A person who refuses to stop their vehicle when demanded by a law enforcement officer often, but not always, has some rationale for refusing to stop, typically because they are wanted for some crime, are escaping from a crime or are in engaged in criminal activity. Some of these people are very dangerous or have committed very serious crimes and, as a result, it is often imperative that they be stopped by not being allowed to escape in their motor vehicle. As such, it is very common for law enforcement officers to pursue a person who refuses to stop their motor vehicle when demanded. In addition to the potential danger that can arise if a criminal escapes, his or her failure to stop the motor vehicle results in a vehicle pursuit which, by its very nature, is dangerous to those involved in the pursuit, namely the criminal and law enforcement officer, and to non-involved persons, including operators of other vehicles, passengers in those vehicles and pedestrians, who happen to be in the area of or cross paths with the vehicles involved in the pursuit.

Due to the fact that deaths and serious injuries can result from law enforcement pursuits, whether they are ultimately successful in stopping the criminal or the criminal escapes, it is generally the policy of most law enforcement agencies to stop the pursued vehicle as soon as safely possible. The need to quickly terminate a motor vehicle pursuit is particularly important if the pursued vehicle is approaching an area of relatively high traffic concentration or areas where the risks to non-involved persons is particularly high, such as near schools, stores, businesses and the like. One approach, often not favored depending on the criminal or crime, is to let the criminal escape by having the law enforcement officers unilaterally cease the pursuit. Depending on the circumstances, law enforcement personnel will utilize one or more techniques to physically stop a pursued vehicle. These techniques can include stationary roadblocks to block a section of road, rolling roadblocks to block the path of moving vehicle and slow it down, spike strips or the like across the path of the vehicle to flatten its tires and use of a law enforcement vehicle to ram, bump or otherwise engage the pursued vehicle to force it off the road and to stop moving. Each of these techniques have advantages and disadvantages that suggest their use or avoidance of their use depending on the circumstances of the pursuit and/or the area in which the pursuit is taking place. Generally, all such techniques require extensive training to successfully and safely stop a pursued vehicle.

One technique that is used by law enforcement personnel to stop a pursued vehicle is commonly referred to as the PIT maneuver (Precision Immobilization Technique). In general, the PIT maneuver is utilized by a pursuing motor vehicle, usually operated by a law enforcement officer, to engage the pursued vehicle in a manner that abruptly turns the pursued vehicle sideways to its direction of travel, which is intended to cause the driver of the pursued vehicle to lose control of the vehicle and stop. When done properly, the PIT maneuver results in minimal risk for the driver and passengers of the pursued vehicle and the pursuing vehicle (typically driven by a law enforcement officer). In use, the pursuing vehicle pulls alongside the pursued vehicle and is positioned with the portion of the pursuing vehicle forward of the front wheels aligned with the portion of the pursued vehicle that is rearward of the back tires. Once in position, the driver of the pursuing vehicle moves the vehicle toward the pursued vehicle until the forward portion of the pursuing vehicle gently makes contact with the rearward portion of the pursued vehicle and then directs the pursued vehicle sharply into the pursued vehicle. This action causes the rear wheels of the pursued vehicle to lose traction and start to skid, causing it to either pivot (i.e., spin) out on or off the road. When the pursued vehicle begins to pivot out of control, the driver of the pursued vehicle quickly brakes his or her vehicle while continuing to turn in the direction it moved to contact the pursued vehicle so the driver of the pursuing vehicle can steer his or her vehicle clear of the now pivoting pursued vehicle. The driver of the pursuing vehicle then recovers control of his or her vehicle and, as applicable, stops the vehicle to assist in the arrest of the driver of the pursued vehicle.

As would be expected, the ability to safely and effectively accomplish the PIT maneuver requires significant training for a person who is to be the driver of the pursuing vehicle. Such training is typically accomplished using hands-on training, meaning the law enforcement officer actually practices doing the PIT maneuver in a moving motor vehicle, so that he or she can be sufficiently skilled in the PIT maneuver so the maneuver can be safely performed in a live pursuit situation. In fact, most law enforcement agencies in the United States generally prohibit officers from performing the PIT maneuver unless they have successfully completed a rigorous training program so they will know when and how to safely perform the maneuver and, equally important, when not to perform the maneuver. Many law enforcement agencies require authorization from senior staff or higher ranked officers before a pursuing officer can perform the PIT maneuver.

One of the problems with training drivers to perform a PIT maneuver is that the cost to supply vehicles for training and practice can be somewhat high. In addition to the body damage that can result from the vehicle-to-vehicle contact, practicing PIT maneuver operations is also very hard on the motor, transmission and other powertrain components of the vehicles utilized as the pursuing vehicle and the pursued vehicle. To reduce contact damage to the vehicle, some law enforcement agencies and companies that provide training to law enforcement agencies utilize enhanced bumpers, such as the push bumpers offered for sale by Setina Manufacturing, Inc. or "home-made" bumper guards, to protect the fenders and other body components of the vehicles. As is well known, these enhanced bumpers are permanently attached to the pursuing and pursued vehicles and/or are not specifically configured to be utilized to facilitate training drivers to perform a PIT maneuver. The abuse to the powertrain components which shortens the operating life of a motor vehicle utilized for PIT maneuver training also results in the enhanced bumpers being out of service due to the fact the bumpers are fixedly attached to a vehicle that is retired or on a vehicle while it is being repaired. Alternatively, the agency or company providing the training has to incur somewhat significant cost to remove the enhanced bumper from the now out-of-service training vehicle and install it on a second vehicle so the second vehicle can be used for PIT maneuver training.

What is needed, therefore, is an improved bumper that removably attaches to a motor vehicle utilized to perform a PIT maneuver, whether in a pursuit situation or for training purposes, and is configured to protect the vehicle from contact damage that would otherwise occur as a result of performing the PIT maneuver. What is also needed is a bumper system that comprises one or more bumper apparatuses that are removably attached to the vehicle and configured to protect the forward and/or rearward portions of the motor vehicle. Any such bumper apparatus or system should be configured so the components thereof are not substantially damaged due to contact with another vehicle or vehicle bumper apparatus. Preferably, the bumper apparatus should be relatively easy, quick and inexpensive to install and remove from a vehicle.

SUMMARY OF THE INVENTION

The vehicle bumper apparatus and system for PIT maneuvers of the present invention provides the benefits and solves the problems identified above. That is to say, the present invention discloses an improved bumper apparatus and bumper system that comprises one or more vehicle bumper guards that are removably attached to a vehicle to protect the vehicle from contact damage that would otherwise result from performing a PIT maneuver. The bumper apparatus and system of the present invention is configured to be relatively easily, quickly and inexpensively installed on and removed from a vehicle that will be utilized to perform a PIT maneuver. For training purposes, the bumper apparatus and system of the present invention can be removably installed on both the pursuing vehicle and the pursued vehicle to protect both vehicles from contact damage that would otherwise result from the vehicle-to-vehicle contact that is necessary to practice performing a PIT maneuver. In one embodiment, the bumper system of the present invention comprises a plurality of bumper apparatuses that are removably attached to the vehicle frame at or near the front and back ends of the vehicle so as to protect the forward and rearward portions of the motor vehicle during when performing a PIT maneuver. In a preferred embodiment, the bumper apparatus and system utilize components that are not substantially damaged by contact with another vehicle or another vehicle bumper apparatus.

In a primary embodiment of the present invention, the vehicle bumper apparatus generally comprises a bumper guard and one or more attachment mechanisms to removably attach the bumper guard to the vehicle. The bumper guard has a first end and a second end and is configured so the first end of the bumper guard can be positioned at one of the ends, namely the front or back end, of the vehicle and the second end of the bumper guard can be positioned at one of the sides, namely the left/driver or right/passenger sides, of the vehicle. When the bumper guard is installed on the vehicle, an end section of the bumper guard will be positioned outwardly from an existing bumper at the end of the vehicle and a side portion of the bumper guard will be positioned outwardly from the side of the vehicle, with the side portion of the bumper guard disposed across either the forward portion or rearward portion of the vehicle. In one embodiment, the side portion of the bumper guard will also extend across the back wheel and rear door of the vehicle. The attachment mechanisms are configured to removably connect the bumper guard to one or more frame members of the frame of the vehicle. The attachment mechanism has one or more mounting members that are each configured to engage at least one of the frame members. Each mounting member has at least one aperture that is positioned thereon in corresponding relation to an existing connector, such as a bolt or screw, on the frame member so as to engage the mounting member with the frame member and removably secure the bumper apparatus to the vehicle, thereby avoiding the need to drill holes in the frame or otherwise modify any of the frame members thereof. The bumper apparatus will typically comprise an extension member that interconnects the bumper guard and mounting member in order to extend the mounting members inward into abutting engagement with the frame members of the vehicle. In some configurations, the extension member will comprise a first extension component that releasably attaches to a second extension component, with the first extension component being fixedly attached to the bumper guard and the second extension component being fixedly attached to the mounting member. Preferably, the bumper guard is a single member that is made out of steel or other stiff materials. The bumper guard can be tubular shaped or have a C-shaped, L-shaped or U-shaped cross-section or have a variety of other shapes. A cap member can be utilized at one or more ends of a tubular shaped bumper guard.

The bumper system of the present invention comprises a vehicle having a frame with a plurality of frame members, a bumper guard having a first end and a second end, a first attachment mechanism and a second attachment mechanism.

The bumper guard is shaped and configured to position the first end of the bumper guard at an end of the vehicle and the second end of the bumper guard at a side of the vehicle. The first attachment mechanism removably connects the bumper guard to a frame of the vehicle at the end of the vehicle in order to extend an end section of the bumper guard outwardly from an existing bumper at the end of the vehicle. The second attachment mechanism removably connects the bumper guard to the frame of the vehicle at the side of the vehicle in order to extend a side section of the bumper guard outwardly from the side of the vehicle. The side section is positioned across one of a forward portion and a rearward portion of the vehicle so as to protect those portions of the vehicle from damage during the execution of a PIT maneuver. Each of the first and second attachment mechanisms have mounting members that are configured to engage the frame of the vehicle. Each of the mounting members have at least one aperture that is positioned on the mounting member in corresponding relation to an existing connector, such as a bolt or screw, on the frame as to engage the mounting member with a frame member of the frame and secure the bumper apparatus to the vehicle without having to drill holes in the frame. In a preferred embodiment, the bumper apparatus of the above system has an extension member that connects the bumper guard to the mounting members to extend the mounting members inward to the frame members of the vehicle. The extension member can have a one or more extension components that are releasably attached to each other so one component can be attached to the frame and the other component can attach to that component to secure the bumper guard to the vehicle. The attachment mechanisms can comprises a plate mounting member, a prong mounting member and/or a tubular mounting member, depending on the location of the existing connectors on the frame.

Accordingly, the primary aspect of the present invention is to provide an improved bumper apparatus and system that have the advantages discussed above and which overcomes the disadvantages and limitations associated with presently utilized vehicle bumper guards and systems.

It is an important aspect of the present invention to provide a bumper apparatus that comprises one or more vehicle bumper guards which removably attach to a motor vehicle at or near the front or back end thereof to protect the forward or rearward portion, respectively, of the vehicle from contact damage that would otherwise occur as a result of performing a PIT maneuver.

It is also an important aspect of the present invention to provide a bumper apparatus that comprises components which are sufficiently strong to withstand the vehicle-to-vehicle contact that occurs during a PIT maneuver without adding a substantial amount of weight to the vehicle or significantly altering the handling of the vehicle.

It is also an important aspect of the present invention to provide a bumper apparatus that comprises a bumper attachment mechanism that allows a bumper guard to be easily, quickly and inexpensively attached to a motor vehicle to protect the vehicle from body damage that would otherwise result from contact with another vehicle or bumper guard apparatus.

It is also an important aspect of the present invention to provide a bumper system that comprises a plurality of bumper apparatuses which are each removably attached at or near the front and/or back ends of a motor vehicle so as to protect the forward and/or rearward portions, respectively, of the vehicle while performing a PIT maneuver.

Another important aspect of the present invention is to provide a bumper system that comprises a bumper apparatuses removably attached near each of the front and back ends of a vehicle so as to protect both the forward and rearward portions, respectively, of the vehicle so the vehicle may be utilized as either the pursuing vehicle or the pursued vehicle during PIT maneuver training without significantly adding to the weight of the vehicle so as to substantially alter the handling of the vehicle.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show and discuss certain shapes and configurations for the components of the bumper apparatus and system, those skilled in the art will understand that this is merely for purposes of simplifying this disclosure and that the present invention is not so limited.

Figure 1:
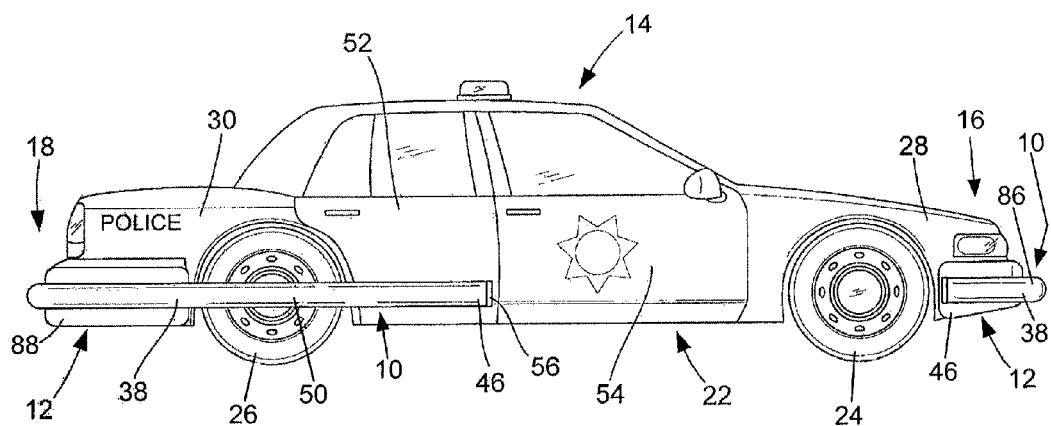
FIG. 1 is a side view of a vehicle configured as a police car or the like having a bumper system configured according to a first embodiment of the present invention with a bumper apparatus at each of the front and back ends of the vehicle.
Figure 2:
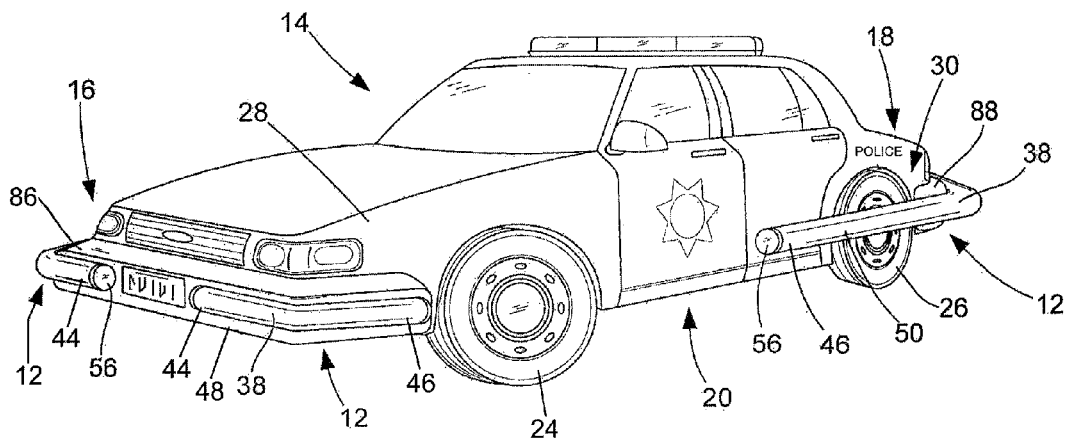
FIG. 2 is a front perspective view of the vehicle of FIG. 1 showing the bumper system of FIG. 1.
Figure 3:
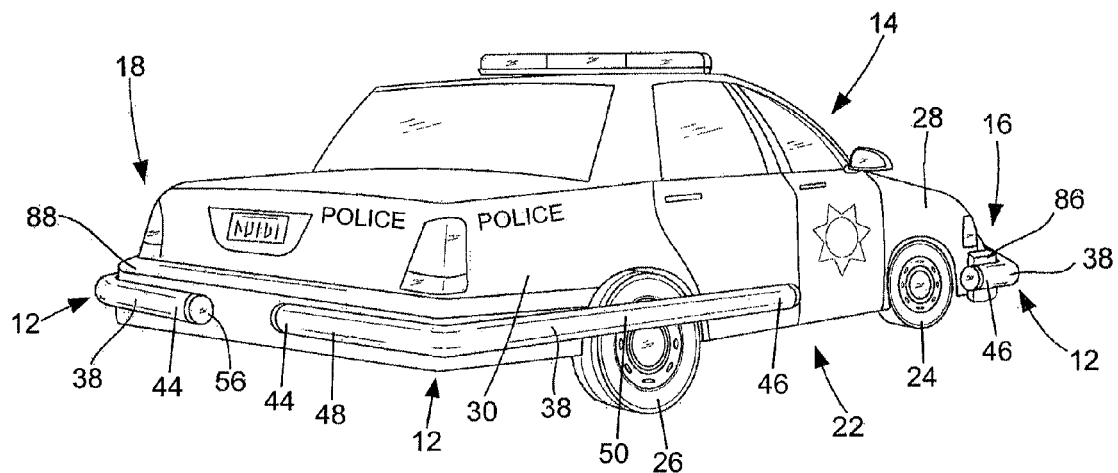
FIG. 3 is a rear perspective view of the vehicle of FIG. 1 showing the bumper system of FIG. 1.

An improved bumper apparatus that is configured pursuant to various embodiments of the present invention is shown generally as 10 in FIGS. 1 through 4. As set forth in more detail below, typically the bumper apparatus 10 will be utilized as part of a bumper system 12 that is removably attached to a motor vehicle 14, usually a police car or the like, as shown in FIGS. 1 through 3 having a forward directed front end 16, a rearward directed back end 18, a first or left/driver's side 20 and a second or right/passenger's side 22. As shown in these figures, vehicle 14 has front wheels 24 toward the front end 16 and rear wheels 26 toward the back end 18. The area of vehicle 14 on each side 20/22 of vehicle 12 between the front wheels 24 and front end 16 is hereinafter referred to as the forward portion 28 and the area of vehicle 12 on each side 20/22 of vehicle 12 between the rear wheels 26 and the back end 18 is hereinafter referred to as the rearward portion 30.

Figure 4:
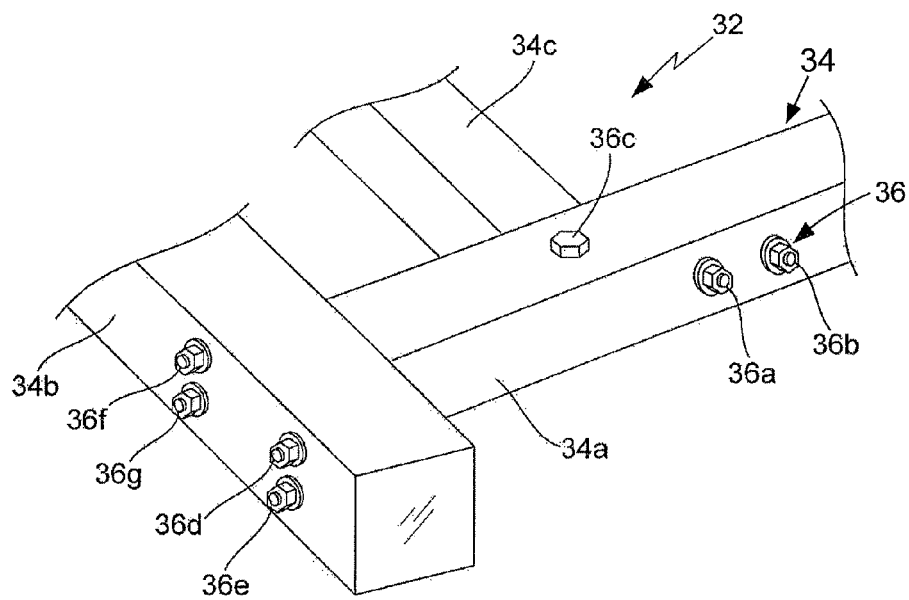
FIG. 4 is a perspective view of a section of the prior art frame of the vehicle shown in of FIG. 1.
Figure 5:
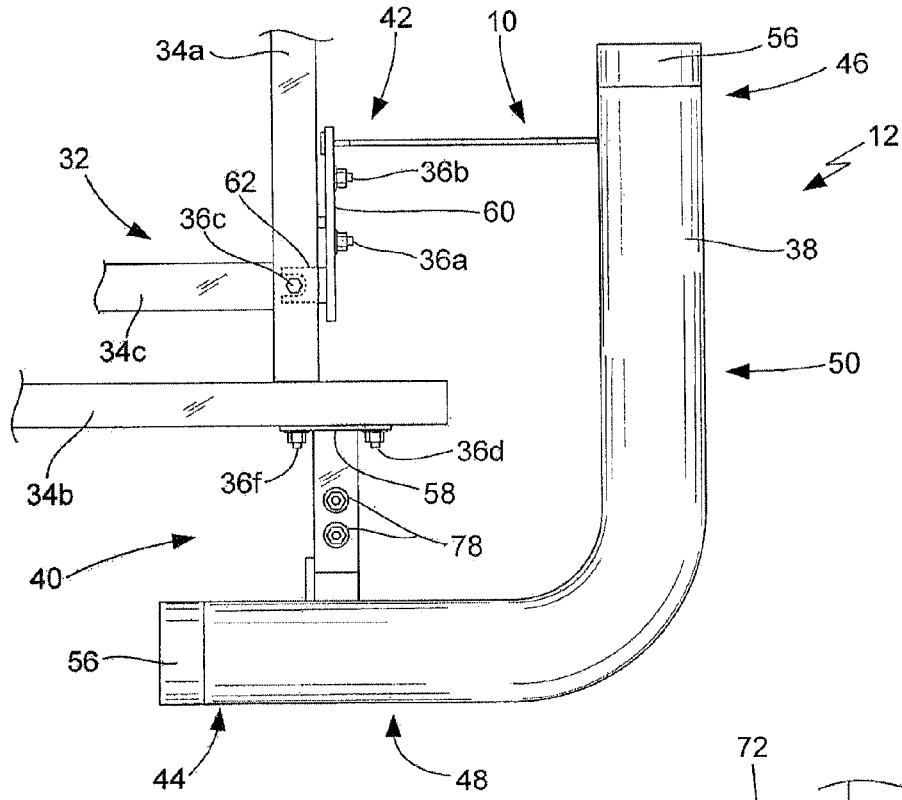
FIG. 5 is a top view of the bumper system of FIG. 1 showing the attachment mechanism of the bumper apparatus securing the bumper guard to the frame of FIG. 4.

As set forth in more detail below, various components of the bumper apparatus 10 removably attach to the frame 32 of vehicle 14, a small section of which is shown in FIGS. 4 and 5, to secure the bumper apparatus 10 to the vehicle 14 so the vehicle 14 can be utilized to accomplish a PIT maneuver, whether in training or during an actual pursuit without damaging the vehicle 14. For ease of installation and removal of bumper apparatus 10 and to reduce the cost of installing or removing bumper apparatus 10, in the preferred embodiment the attachment components of the bumper apparatus 10 are configured to engage existing bolts and/or other connectors that are utilized with the frame 32 of vehicle 14. This is accomplished by providing apertures in the attachment components of bumper apparatus 10 that are in corresponding relation to existing connectors utilized to interconnect frame components of frame 32 or attach other components of the vehicle 14, such as parts of the body, existing bumpers and the like, to the frame 32 of vehicle 14. In this manner, the frame apparatus 10 can be quickly bolted onto or unbolted from the frame 32 of vehicle 14 as needed to prepare vehicle 14 for use to perform PIT maneuvers or to remove the bumper apparatus 10 from the vehicle 14 (e.g. to place bumper apparatus 10 on another vehicle).

As well known in the art, vehicle 14 has a frame 32 comprising a plurality of frame members, such as first frame member 34a, second frame member 34b and third frame member 34c (hereinafter referred to collectively as frame members 34), as best shown in FIG. 4. As also well known, the frame 14 has a plurality of existing connectors, shown collectively as 36, that are utilized to join two or more frame members 34 together and/or to connect other components of the vehicle 14, such as portions of the body thereof, to the frame members 34 to be supported by frame 32. Each of the various connectors 36, which typically comprise a bolt/nut/washer combination or a screw, are received through a corresponding aperture (not shown) in the respective frame member 34. The typical frame 32 will comprise many such connectors 36, including connectors 36a and 36b through the side of first frame member 34a, connector 36c through the top of first frame member 34a and connectors 36d, 36e, 36f, and 36g through the side of the second frame member 34b, as best shown in FIG. 4. As set forth in more detail below and shown in FIG. 5, these and other existing connectors 36 are utilized in the bumper system 12 to removably connect components of the bumper apparatus 10 to the frame 32 of vehicle 14.

Figure 6:
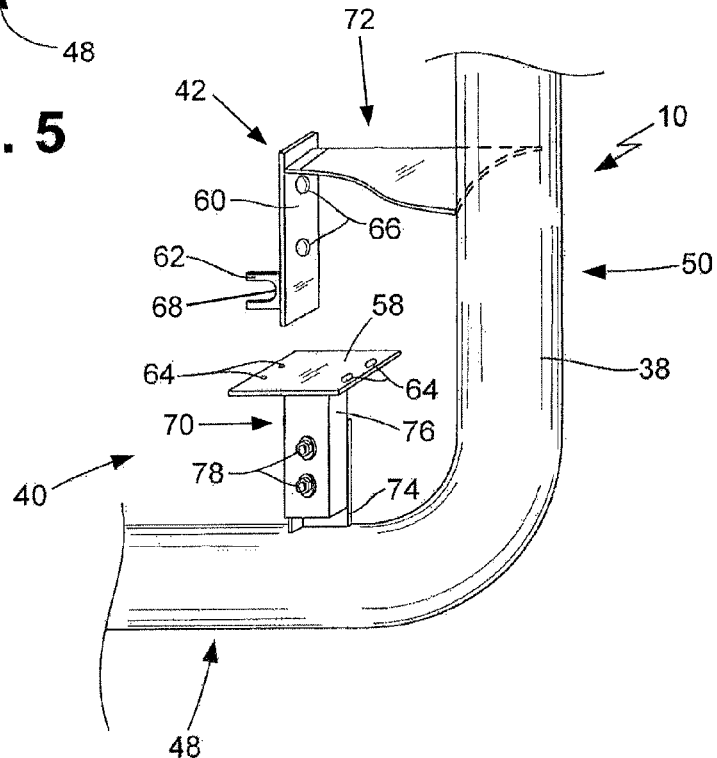
FIG. 6 is a top perspective view of the bumper apparatus of FIG. 5.

As shown in FIGS. 5 and 6, bumper apparatus 12 of the present invention generally comprises a bumper guard 38 and one or more attachment mechanisms, such as first attachment mechanism 40 and second attachment mechanism 42, that are utilized to removably attach the bumper guard 38 to the vehicle 14. As shown in FIGS. 1 through 3, when attached to vehicle 14, the bumper guard 38 extends outwardly from vehicle 14 so as to protect the body, wheels 24/26 and other components of vehicle 14, which can be either the pursuit vehicle or the pursued vehicle when training to execute a PIT maneuver. Bumper guard 38 has a first end 44 and a second end 46 and is shaped and configured such that the first end 44 of the bumper guard 38 is at one of the ends 16/18 of the vehicle 14 and the second end 46 of bumper guard 38 is at one of the sides 20/22 of vehicle 14 so as to protect the ends 16/18 and the area of sides 20/22 most likely to be damaged during a PIT maneuver. As shown in FIGS. 1 through 3, bumper apparatus 10 is configured such that it dispose bumper guard 38 across either the forward portion 28 or the rearward portion 30 of the vehicle 14. More specifically, when the first end 44 of the bumper guard 38 is positioned at the front end 16 of the vehicle 14, as best shown in FIG. 2, the second end 46 of the bumper guard 38 is positioned along one of the sides 20/22 of vehicle 14 so as to dispose the bumper guard 38 across the forward portion 28 of the vehicle 14, as best shown in FIGS. 1 and 2, and when the first end 44 of bumper guard 38 is positioned at the back end 18 of vehicle 14, as shown in FIG. 3, the second end 46 of bumper guard 38 is positioned along one of the sides 20/22 of vehicle 14 so as to dispose the bumper guard 38 across the rearward portion 30 of the vehicle 14, as best shown in FIGS. 1 and 3. The bumper guard 38 comprises an end section 48, best shown in FIGS. 5 and 6, that extends across part of either the front end 16 or back end 18 of the vehicle 14, as shown in FIGS. 2 and 3, and a side section 50, also best shown in FIGS. 5 and 6, that extends across part of either the first side 20 or second side 22 of the vehicle 14, as shown in FIGS. 1 through 3. The side section 50 that protects the rearward portion 30 of vehicle 14 can extend toward the front end 16 of vehicle 14 to protect the back wheels 26 and back door 52 of vehicle 14, as best shown in FIG. 1. Although not shown in the figures, the side section 50 that protects the forward portion 28 of vehicle 14 can extend toward the back end 18 of vehicle 14 a sufficient distance to protect the front wheels 24 and, if desire the front door 54 of vehicle 14.

In a preferred embodiment, the bumper guard 38 is made out of steel that is sufficiently strong to protect the vehicle 14 from the contact that will occur during the execution of a PIT maneuver, whether during actual pursuit operations or during training. Alternatively, a wide variety of materials, including various other metals, composites and the like, can be utilized for the bumper guard 38. In the embodiment shown in FIGS. 1 through 6, the bumper guard 38 is tubular, which is believed to provide higher strength to weight benefits for use on vehicle 14. In this embodiment, a cap member 56 can be utilized to close the ends 44/46 of tubular bumper guard 38 to prevent the accumulation of water or other fluids on the interior of the bumper guard 38. Preferably, the cap members 56, best shown in FIGS. 5 and 6, are fixedly attached to the ends 44/46 by welding or other attachment means appropriate for the materials utilized for bumper guard 38. In an alternative embodiments, such as the embodiment shown in FIGS. 7 and 8, bumper guard 38 can be made out of a C-shaped, L-shaped, U-shaped or other material formed in other shapes. Generally, these other shapes will not require a cap member 56 on the ends 44/46 of the bumper guard 38.

As set forth above, the bumper apparatus 10 has one or more attachment mechanisms, such as first attachment mechanism 40 and second attachment mechanism 42, that securely but removably attach bumper guard 38 to one or more frame members 34 of the frame 32 of vehicle 14. As best shown in FIGS. 5 and 6, each of the attachment mechanisms 40/42 have one or more mounting members that are sized and configured to engage at least one of the frame members 34 to secure the bumper apparatus thereto, as best shown in FIG. 5. In the embodiment shown in FIGS. 5 and 6, first attachment mechanism 40 has a plate mounting member 58 and the second attachment mechanism 42 has two mounting members, a plate mounting member 60 and a prong mounting member 62, as best shown in FIG. 6. Plate mounting members 58/60 are sized and configured to abut against the side of one or more frame members, such as frame member 34a for plate mounting member 60, and frame member 34b for plate mounting member 58, as shown in FIG. 5. The prong mounting member 62 is configured to engage the bottom surface of frame member 34a, as also shown in FIG. 5. Each of the mounting members have one or more apertures that are sized, shaped and positioned on the mounting member so each of the apertures on the mounting members are in corresponding relation to an existing connector 36 that are associated with frame 32. Plate mounting member 58 has four hole apertures 64 therein that are positioned on plate mounting member 58 so as to be in corresponding relation with existing connectors 36d, 36e, 36f and 36g such that when the plate mounting member 58 is placed in abutting relation to the frame member 34b the existing connectors 36d-g will be aligned therewith and the existing connectors 36d-g, if long enough, can be used to secure the plate mounting member 58 to frame member 34b, as shown in FIG. 5 for connectors 36d and 36f. The plate mounting member 60 has two hole apertures 66 that are positioned on plate mounting member 60 so as to be in corresponding relation with the existing connectors 36a and 36b such that when the plate mounting member 60 is placed in abutting relation to the frame member 34a the existing connectors 36a-b will be aligned therewith and the existing connectors 36a-b, if long enough, can be used to secure plate mounting member 60 to frame member 34a, as shown in FIG. 5. Likewise, the prong mounting member 62 has one open aperture 68 that is positioned on prong mounting member 62 so as to be in corresponding relation with the existing connector 36c such that when the prong mounting member 62 is placed in abutting relation to the underside of frame member 34a, as shown in FIG. 5, the existing connector 36c will be aligned therewith and the existing connector 36c, if long enough, can be used to secure the prong mounting member 62 to frame member 34a, as shown in FIG. 5. In each of the foregoing, it is generally preferred to utilize the existing connectors 36 if the connectors 36 are sufficiently long enough to extend past the respective abutting mounting members 58/60/62. If the existing connectors 36 are not long enough to securely, but removably, attach the mounting members 58/60/62 to their respective frame members 34, then the existing connector(s) 36 can be replaced with a sufficiently long connector. In either use, the user of the bumper apparatus 10 can quickly install or remove bumper apparatus 10 from vehicle 14 without having to drill any holes or weld any components to the frame 32 of vehicle 14.

Both attachment mechanisms 40/42 have an extension member that extends the plate mounting members 58/60 from the bumper guard 38 inward toward the frame 32 of vehicle 14 to position the mounting members 58/60 in abutting relation to their respective frame members 34. Attachment mechanism 40 has extension member 70 that extends the plate mounting member 58 to be in abutting relation to the frame member 34b and attachment mechanism 42 has extension member 72 that extends the plate mounting member 60 to be in abutting relation to the frame member 34a. The extension member 72, which interconnects the side section 50 of bumper guard 38 to the plate mounting member 60, is fixedly attached at both ends thereof, typically by welding or the like as is appropriate for the materials utilized for these components, and is shaped so it can be placed around components of vehicle 14 and not contact those components when the vehicle 14 is in use. The extension member 70 interconnects the end section 48 of bumper guard 38 to plate mounting member 58. In the embodiment shown in FIGS. 5 and 6, extension member 70 has two separate components, a first extension component 74 and a second extension component 76, that are removably attached together by one or more attachment devices 78, such as a bolt/nut/washer combination. One end of first extension component 74 is welded or otherwise fixedly attached to the bumper guard 38 and one end of second extension component 76 is welded or otherwise fixedly attached to the plate mounting member 58. Extension member 70 has two separate components 74/76 so the plate mounting member 58 can be attached to the frame member 34 with the second extension component 76 extending outwardly of an end 16/18 of vehicle 14 and then joined with the first extension component 74 using attachment devices 78. This allows the end section 48 of the bumper guard 38 to be attached to the front 16 or back 18 end of vehicle 14 without removing or altering the existing bumper, grill or other components of vehicle 14.

Figure 7:
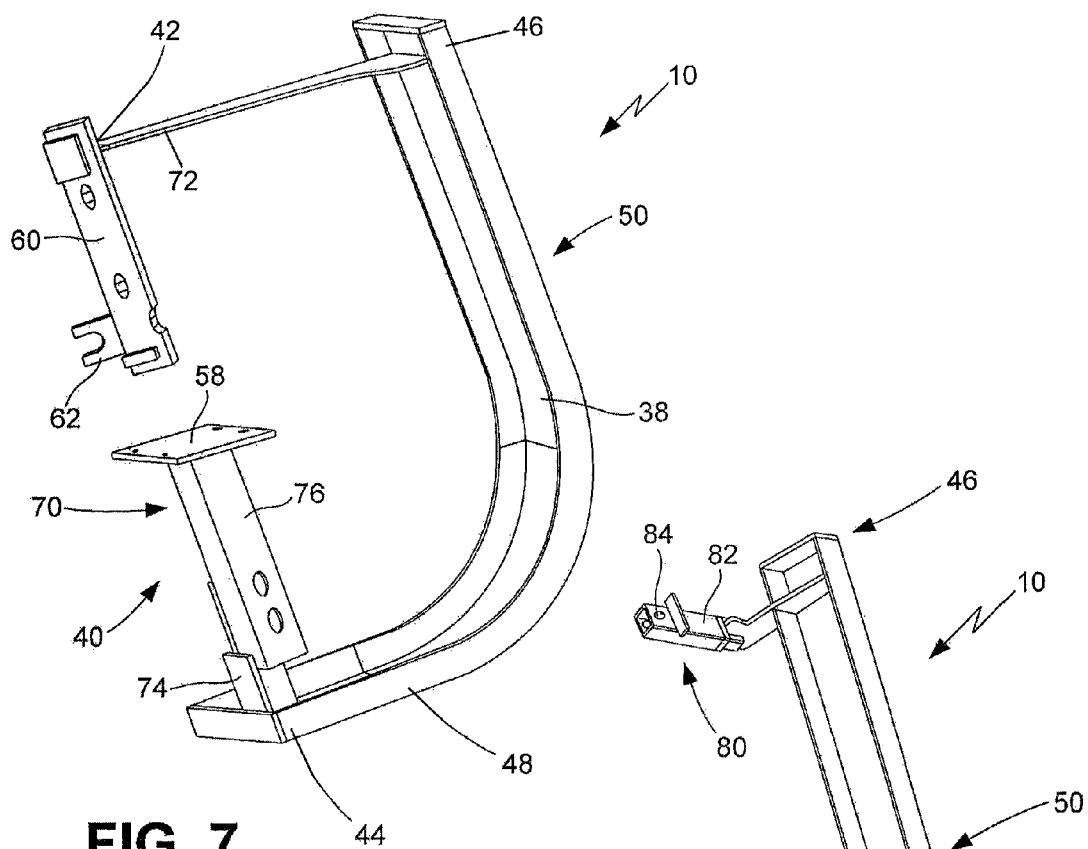
FIG. 7 is a side perspective view of an alternative embodiment of the bumper apparatus of the present invention showing use of a C-shaped member as the bumper guard.
Figure 8:
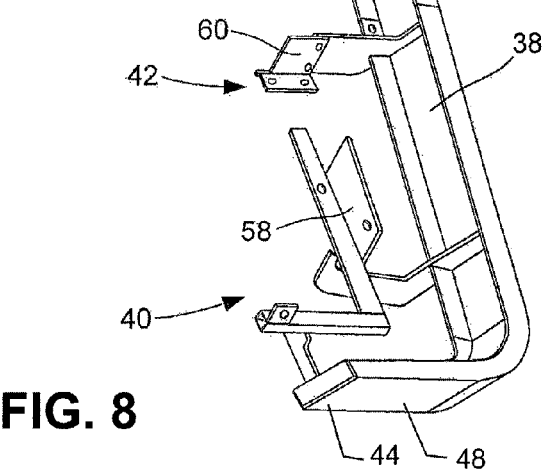
FIG. 8 is a side perspective view of an alternative embodiment of the bumper apparatus of the present invention shown configured for use on the passenger side of a vehicle.

The embodiments of FIGS. 7 and 8 show a bumper apparatus 10 having a non-tubular structure for the bumper guard 38. The embodiment of FIG. 7 is substantially the same configuration as the embodiment of FIGS. 5 and 6, except that the bumper guard 38 is made from a C-shaped member. Although use of a steel tubular shaped member for the bumper guard 38 is thought to provide the most desirable strength-to-weight ratio, use of a bumper guard 38 made out of other materials or use of a C-shaped member for bumper guard 38 (as well as other shaped structural members, including use of an L-shaped member, a U-shaped member and the like, as described above) is also believed to provide an effective bumper apparatus 10. Depending on the materials used for bumper guard 38, as well as other factors, the non-tubular shaped members may be more desirable. The embodiments of FIGS. 5 through 7 are configured for attachment to the typical left front position on vehicle 14, which will protect a portion of the front end 16 of the vehicle 14 and a portion of the first side 20, namely the forward portion 28, of vehicle 14. The embodiment of FIG. 8 shows a bumper apparatus 10 that is configured for the typical right rear position on vehicle 14, which will protect a portion of the back end 18 of the vehicle 14 and a portion of the second or passenger side 22, namely the rearward portion 30, back wheels 26 and rear door 52, of the vehicle 14. Due to the length of this bumper apparatus 10, it is configured with a third attachment mechanism 80 towards the second end 46 of the bumper guard 38. The third attachment mechanism 80 has a tubular mounting member 82 with an aperture 84 that is sized and positioned to receive an existing connector 36, as set forth above for the other apertures 64/66/68 and existing connectors 36. As such, aperture 84 is also positioned to be in corresponding relation to the location of the connector that will be received through aperture 84 to secure the third attachment mechanism 80 to the frame 32. In one embodiment, the extension member associated with third attachment mechanism 80 can be configured to extend into and securely engage the tubular mounting member 82.

As is well known, the vehicle 14 has an existing front bumper 86 and an existing rear bumper 88, as shown in FIGS. 1-3. The bumper apparatus 10 of the present invention is configured such that the user does not have to remove or alter the existing bumpers 86/88 in order to utilize bumper apparatus 10 with the system 12. When the bumper apparatus 10 is installed on vehicle 14, the bumper apparatus 10 will extend outwardly from the relevant existing bumper 86/88. More specifically, when bumper apparatus 10 is installed on the front end 16 of vehicle 14, the bumper guard 38 will be positioned such that the first end 44 and the end section 48 of the bumper guard 38 will be outwardly of the existing front bumper 86, to prevent damage to the existing front bumper 86 and other components of vehicle 14, with the second end 46 and side section 50 of the bumper guard 38 positioned along one of the sides 20/22 of vehicle 14 to protect at least the forward portion 28 of vehicle 14, as best shown in FIG. 2. Further, when the bumper guard 38 is installed on the back end 18 of vehicle 14, bumper guard 38 will be positioned such that the first end 44 and end section 48 of the bumper guard 38 will be outwardly of the existing rear bumper 88, to prevent damage to the existing rear bumper 88, trunk and other components of vehicle 14, with the second end 46 and side section 50 of bumper guard 38 positioned along one of the sides 20/22 of vehicle 14 to protect at least the rearward portion 30 of vehicle 14, as best shown in FIG. 3. In a preferred configuration of the back end 18 embodiment, bumper guard 38 will be sized so the second end 46 thereof will be positioned generally toward front end 16 of vehicle 14, as shown in FIGS. 1-3, so as to also protect back wheel 26 and rear door 52 of vehicle 14.

In use, one or more bumper apparatuses 10 will be installed on the front end 16 or back end 18 of vehicle 14. For executing PIT maneuvers during an actual vehicle pursuit, with vehicle 14 as the pursuing vehicle, it is generally only necessary to utilize bumper apparatuses 10 on the front end 16 of vehicle 14. For training purposes, the bumper apparatuses 10 can be placed on the front end 16 of the vehicle 14 that is utilized as the pursing vehicle or the back end 18 of the vehicle 14 that is utilized as the pursued vehicle. Alternatively, and perhaps a more common usage, bumper apparatuses 10 can be placed on both the front end 16 and back end 18 of a vehicle 14 so the vehicle 14 can be utilized as either the pursuing vehicle or the pursued vehicle. As stated above, bumper apparatus 10 is quickly, easily and removably attached to the vehicle 14 by using one or more existing connectors 36 on the vehicle 14 to interconnect (typically by receiving the shaft of a bolt or the like therethrough) with apertures, such as apertures 64, 66, 68 and 84, that are positioned on a mounting members, such as mounting members 58, 60, 62 and 82, in corresponding relation to the existing connectors 36. The materials and configurations of the components for the attachment mechanisms 40/42, namely the bumper guard 38, mounting members 58/60/62/82 and extension members 70/72 and the like, are chosen to fit the vehicle 14 and to be sufficiently strong to protect the vehicle 14 and bumper apparatus 10 from damage. When vehicle 14 needs to be replaced or otherwise taken out of service, whether for actual pursuits or training, due to engine, transmission or other operation issues, the user of the bumper system 12 can easily remove the bumper apparatus 10 from the vehicle 14 and place it on another vehicle for use therewith.

While there are shown and described herein one or more specific embodiments of the invention, it will be readily apparent to those skilled in the art that the invention is not so limited, but is susceptible to various modifications and rearrangements in design and materials without departing from the spirit and scope of the invention. In particular, it should be noted that the present invention is subject to various modifications with regard to any dimensional relationships set forth herein, with regard to its assembly, size, shape and use and with regard to the materials used in its construction. For instance, there are a number of components described herein that can be replaced with equivalent functioning components to accomplish the objectives of the present invention.

What is claimed is:

1. A bumper apparatus for a vehicle having a front bumper coupled to a front portion of the vehicle and a rear bumper coupled to a rear portion of the vehicle and having a frame extending therebetween, said bumper apparatus, comprising:

a vehicle having a frame comprising a plurality of frame members;

a bumper guard having a first end and a second end, said bumper guard shaped and configured so as to position said first end of said bumper guard at an end of said vehicle and said second end of said bumper guard at a side of said vehicle;

a first attachment mechanism removably connecting said bumper guard to said frame of said vehicle at said end of said vehicle so as to extend an end section of said bumper guard outwardly of an existing bumper at said end of said vehicle;

wherein said first attachment mechanism includes a plate mounting member configured to abut a side of a respective frame member of the vehicle frame;

a second attachment mechanism removably connecting said bumper guard to said frame of said vehicle at said side of said vehicle so as to extend a side section of said bumper guard outwardly from said side of said vehicle and across one of a forward portion and a rearward portion of said vehicle;

wherein said second attachment mechanism includes another plate mounting member configured to abut a side of another respective frame member and includes a prong mounting member configured to abut a bottom of a respective frame member;

wherein:

each of said attachment mechanisms have one or more mounting members configured to engage said frame, each of said mounting members having at least one aperture thereon that is positioned thereon in corresponding relation to an existing connector on said frame as to engage said mounting member with a frame member of said frame and secure said bumper apparatus to said vehicle.

2. The bumper apparatus of claim 1, wherein said end section is connected to or integral with said side section of said bumper guard with said side section being disposed outward from and extending across a rear door and a back wheel of said vehicle.

3. The bumper apparatus of claim 1, wherein said bumper apparatus further comprises an extension member interconnecting said bumper guard and said mounting members so as to extend said mounting members to said frame members of said vehicle.

4. The bumper apparatus of claim 3, wherein said extension member comprises a first extension component and a second extension component releasably attached to said first extension component, said first extension component fixedly attached to said bumper guard, said second extension component fixedly attached to said mounting member.

* * * * *